July 11, 1950
R. C. BENSON
2,514,832
ANGLE HOLE DIGGER
Filed July 21, 1947
3 Sheets-Sheet 1
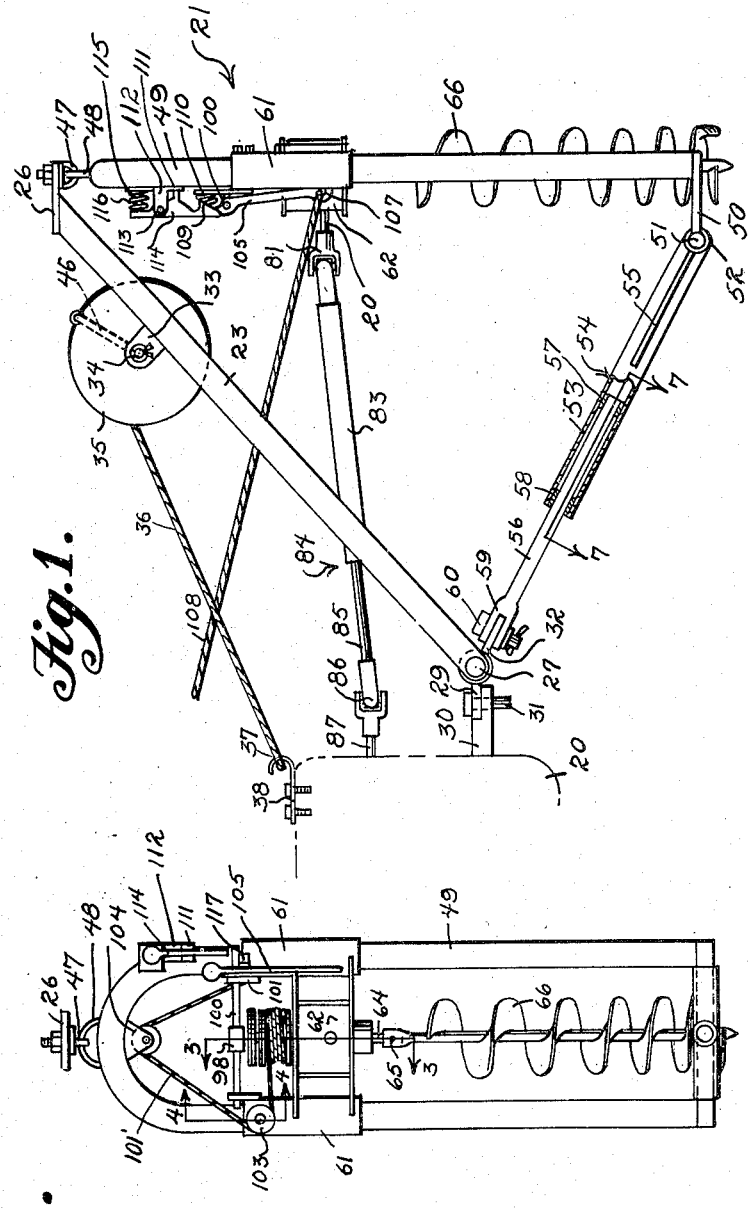
INVENTOR.
Robert C. Benson
BY Victor J. Evans & Co.
ATTORNEYS

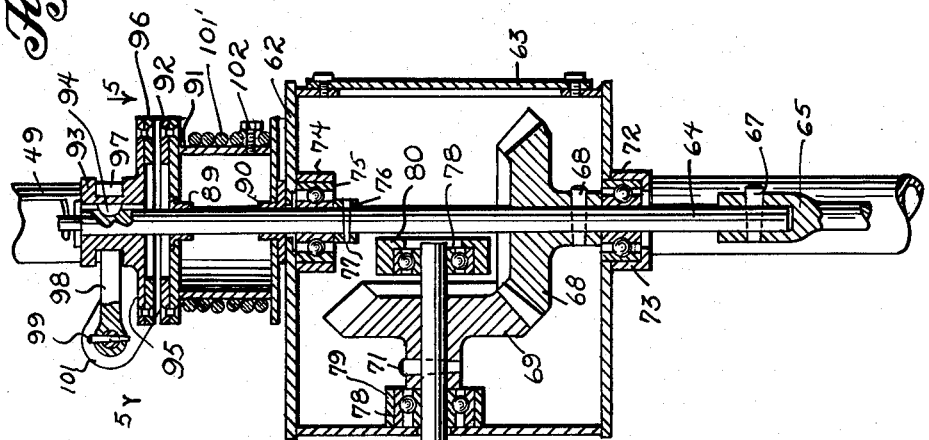

July 11, 1950 R. C. BENSON 2,514,832
ANGLE HOLE DIGGER
Filed July 21, 1947 3 Sheets-Sheet 3
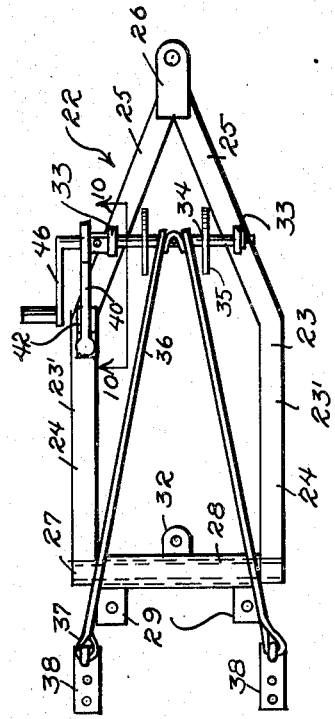
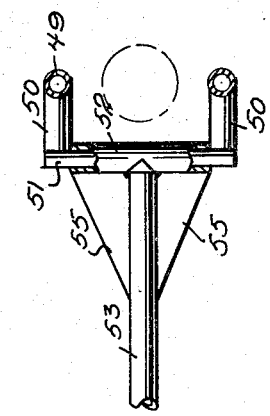
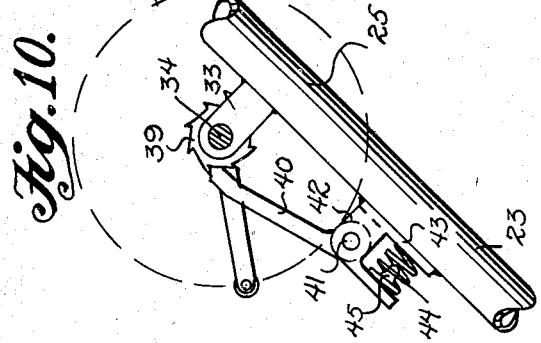
INVENTOR.
Robert C. Benson
BY *Victor J. Evans & Co.*
ATTORNEYS Patented July 11, 1950

2,514,832

UNITED STATES PATENT OFFICE 2,514,832

ANGLE HOLE DIGGER

Robert C. Benson, Kirksville, Mo.

Application July 21, 1947, Serial No. 762,309

1 Claim. (Cl. 255—19)

This invention relates to an angle hole digger which is adapted to be mounted on a power unit of a tractor or a truck and will bore a vertical hole regardless of the position of the truck or tractor with relation to the ground and regardless of the contour of the ground.

An object of the invention is to provide a post hole digger which is designed to be mounted on a power take-off unit, and which can be mounted on a take-off of the power take-off unit by one man without the use of jacks, tools or other similar equipment.

Another object of the invention is to provide a post hole digger that can be adjusted with relation to the mounting therefor, so that the digger will always bore a vertical hole.

With the above and other objects and advantages in view, the invention consists of the novel details of construction, arrangement and combination of parts more fully hereinafter described, claimed and illustrated in the accompanying drawings in which:

Figure 1 is an elevational view of an embodiment of the invention, shown mounted on the power unit;

Figure 2 is a front elevational view thereof;

Figure 3 is a sectional view on the line 3—3 of Figure 2;

Figure 4 is a sectional view on the line 4—4 of Figure 2;

Figure 5 is a sectional view on the line 5—5 of Figure 3;

Figure 6 is a sectional view on the line 6—6 of Figure 5;

Figure 7 is a sectional view on the line 7—7 of Figure 1;

Figure 8 is a plan view of the carrier boom;

Figure 9 is a detailed sectional view of one end of the torque bar and

Figure 10 is a sectional view on the line 10—10 of Figure 8.

Referring more in detail to the drawings, and more particularly to Figure 1, a fragmentary showing of the rear end of a tractor is designated by the reference numeral 20, while the angle hole digger embodying the invention is generally designated by the reference numeral 21.

As seen in Figure 8 the carrier boom 22 of the digger comprises a frame 23 having side members 23' formed with straight opposed parallel portions 24 and inwardly inclined portions 25 joined at their free ends by the connector plate 26, which is in horizontal relation to the plane of the frame when it is mounted as shown in Figure 1.

The opposite ends of the portions 24 carry a shaft 27 on which is mounted the sleeve 28. The sleeve has horizontally disposed apertured ears 29 secured thereto intermediate of the portions 24 which are attached or connected to the draw bar 30 of the tractor 20 by removable pins 31. Centrally of the sleeve 28, there is provided a downwardly inclined apertured ear 32, the purpose of which is to be later described.

Formed on each of the portions 25 in vertical relation thereto, are the apertured ears 33 which carry the axle 34 of the drum 35, on which is wound the cable 36 in triangular formation, so the free ends of the cable 36 which are provided with loops 37 may be secured to the hooks 38 which are secured to the rear of the tractor 20 in opposed parallel relation to each other.

The axle 34 of the drum 35 carries a ratchet 39 which engages with the dog 40 mounted by the pin 41 in the apertured ears 42 of the bracket 43 secured to the frame 23, and a coil spring 44 sleeved on the nut 45 on the dog and engaging the bracket 43 urges the dog into engagement with the ratchet 39 so that when the crank 46 on the axle 34 is rotated to wind the cable 36 on the drum, the dog 40 will prevent unwinding of the cable until the dog is disengaged from the ratchet.

The plate 26 carries the eye 47 which engages the eye 48 which is fixed on the U-shaped digger frame 49 centrally of the U-bend thereof.

The frame 49 has the rearwardly extending plates 50 secured to the lower ends thereof, and these plates carry the shaft 51 on which is sleeved the tubular member 52 which is secured to the lower end of the tubular section 53 of the torque bar at right angles thereto. The angle plates 55 reinforce the connection to prevent breakage thereof.

The rod 56 of the torque bar 54 is telescopically mounted in the tubular section 53, and is threaded at one end to receive the bushing 57 which provides perfect alinement of the rod and tubular section. The forward end of the section carries the bushing 58 which being sleeved on the rod 56 performs the same operation as the bushing 57.

The rear end of the rod 56 is provided with a yoke 59 which is connected to the ear 32 on the sleeve 28 by the removable pin 60. Thus the boom 22 and frame 49 and torque bar 54 will move as a unit on the shaft 27 when the cable 36 is wound on the drum 35.

Slidably mounted on the opposite sides of the frame 49 are the sleeves 61 which carry the gear box 62 having the removable plate 63 secured thereto so that access can be gained to the interior of the gear box 62.

The drive shaft 64 is connected to the upper yoked end 65 of the auger 66 by the tapered pin 67. A bevelled gear 68 secured to the shaft 64 by a tapered pin 68' engages the bevelled gear 69 secured to the shaft 70 by the tapered pin 71. The shaft 64 is journalled in the roller bearing 72 carried by the box 73 secured to the box 62 on the outer bottom surface thereon. The box 62 also carries the box 74 for the roller bearing 75 which is also sleeved on the shaft 64, and a collar 76 secured to the shaft 64 by the tapered pin 77 retains the roller bearing 75 in the box 74. The shaft 70 is journalled by the roller bearings 78 carried by the boxes 79 and 80 respectively, which are secured to the box 62 inwardly thereof.

The shaft 70 is connected to the universal joint 81 by the tapered pin 82, and the joint 81 is secured to the tubular section 83 of the power take-off connector shaft 84. The rod 85 of the shaft 84 is telescopically received in the section 83, and connected at its rear end to the universal joint 86 which is connected to the power take-off shaft 87. Fixed rotation of the rod 85 and section 83 is accomplished by engaging of the projecting pin 88 on the inner wall of the section 83 engaging the longitudinal slot 89 formed in the rod 85. The pin 88 permits sliding motion of the section 83 and rod 85, but causes the two to rotate as a unit.

Sleeved on the shaft 64, above the box 62, are the upper and lower bushings 89 and 90 respectively of the drum 91, which is provided on its upper surface with a friction ring 92. A collar 93 keyed to the shaft 64 at 94 is provided with the lower flange 95 carrying the friction ring 96 in opposed relation to the ring 92. Thus a friction clutch arrangement is provided for the collar 93 and drum 91. The collar is provided with the central annular groove 97 for engagement with the yoke 98 which by a tapered pin 99 is secured to the shaft 100 journalled in the apertured ears 101 which are secured to the frame 49 in opposed parallel relation to each other. A cable 101' is secured at 102 to the drum 91 and wound thereon and is trained over the pulley 103 rotatably mounted on one of the sleeves 61 and over the pulley 104 secured to the inner surface of the bend of the frame 49. From the pully 104, the cable is led to and fastened at 108' to the sleeve 61 in opposed relation on the frame 49, to sleeve 61 on which the pulley 103 is mounted.

On the shaft 100, there is fixed by the tapered pin 106 the clutch operated control arm 105, having the opening 107 at its lower end, to which the control cable 108 is attached. A spring 109 sleeved on the nut 109' on the arm 105 and engaging the bracket 110 on the sleeve 61 urges the control arm 105 inwardly to disengage the friction rings. Therefore, a pull on the cable 108 will move the arm 105 outwardly to cause engagement of the friction rings for a purpose to be later described.

Secured to the frame 49 adjacent the bend thereof, is a bracket 111 having opposed apertured ears 112 for the pin 113, on which the latching dog 114 is mounted. A spring 115 sleeved on the nut 116 on the dog engages the bracket 111, and urges the lower end of the dog inwardly. The lower end of the dog 114 is hooked to engage the shaft 100, so that the dog will retain the sleeves in elevated position on the frame 49.

The hooked end of the dog 114 overlies the projection 117 on the arm 105.

In use with the boom mounted on the rear of the tractor, as previously described, and the shaft 84 mounted as shown in Figure 1, the device is ready for operation. When it is to be moved from one location to another, the crank 46 is rotated, swinging the digger outwardly out of engagement with the ground. At the digging location, the cable 36 is permitted to unwind until the auger is in digging position.

By pulling on the cable 108, the arm 105 will be moved outwardly to permit the auger to move downwardly by means of the sleeves 61 sliding on the frame 49. The power take-off is caused to rotate the auger and the hole is bored.

The telescoping bar 54 permits the auger to swing backward and forward so that by reason of its own weight, it will lie in a vertical plane, since the eye connection of the frame with the boom will permit the digger to move sideways as desired. The frame permits the take-off shaft to swing sideways as the digger swings sideways.

When the hole is bored and it is desired to raise the auger, the cable 108 is pulled until the friction rings 92 and 96 are engaged, causing the drum 91 to rotate and wind the cable 108 thereon. Since one end of the cable is fixed to one of the sleeves 61 on the frame 49, the cable will cause the auger to rise by the sleeves 61 sliding upwardly on the frame 49. The tractor can be moved after the hooked end of the dog engages the shaft 100 and the procedure repeated to permit another hole to be dug.

There has thus been provided a post hole digger which, acting like a plumb bob will always lie in a vertical plane, due to its own weight, so that a vertical hole can be dug, regardless of the position of the tractor or truck on which it is mounted.

It is believed that from the foregoing description, the operation and construction of the digger will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A post hole digger of the character described in combination with a power take-off unit of a tractor, comprising a boom pivotally connected to said tractor, a substantially U-shaped frame loosely supported by said boom at the top thereof, a telescoping torque bar connected at one end to the bottom of said frame and at its other end to the tractor whereby the frame will, by its own weight, lie in a vertical plane, an auger, sleeves slidably mounted on said frame, a gear box carried by said sleeves intermediate of said frame, gear means on said gear box, means connecting said auger to said gear means and means connected to said gear means and said power take-off for the rotation of said auger, a reel mounted on said boom having a rope wound thereon and having its free end connected to said tractor, handle means mounted on said reel whereby upon operation of said handle means said reel is rotated and said rope will further wind up thereon to cause vertical lifting of the U-frame, a second reel carried by said gear box, a second rope wound on said second reel, trained over pulleys mounted on one of said sleeves and on said U-frame respectively and fixed at its free end to said frame, clutch means mounted on said second reel, means operably connecting said clutch means to the gear means within said gear box, clutch shifting means mounted on said gear box, whereby upon engagement of said clutch means said second reel is rotated to wind up said second rope thereon and cause said auger to be raised and upon release of said clutch means said second rope is allowed to unwind from said second reel to allow said auger to be lowered.

ROBERT C. BENSON.

REFERENCES CITED

The following references are of record in the file of this patent:

UNITED STATES PATENTS

| Number | Name | Date |
|---|---|---|
| 595,609 | Davis | Dec. 14, 1897 |
| 1,073,821 | Roberts | Sept. 23, 1913 |
| 1,271,904 | Jones | July 9, 1918 |
| 1,602,375 | Gibson | Oct. 5, 1926 |
| 1,999,115 | Shinn | Apr. 23, 1935 |
| 2,081,200 | Hollingsworth | May 25, 1937 |
| 2,122,686 | Gaty | July 5, 1938 |
| 2,321,680 | Houston | June 15, 1943 |
| 2,410,508 | Lamme | Nov. 5, 1946 |
| 2,453,204 | Dobbs | Nov. 9, 1948 |
| 2,468,319 | Adams | Apr. 26, 1949 |
| 2,474,981 | McCardell | July 5, 1949 |